June 30, 1953     J. D. PETERSON     2,644,065

WINDSHIELD TEMPERATURE CONTROLLER

Original Filed Dec. 31, 1948

INVENTOR.
JOEL D. PETERSON
BY
ATTORNEY

Patented June 30, 1953

2,644,065

UNITED STATES PATENT OFFICE 2,644,065

WINDSHIELD TEMPERATURE CONTROLLER

Joel D. Peterson, Rivervale, N. J., assignor to Bendix Aviation Corporation, Teterboro, N. J., a corporation of Delaware Original application December 31, 1948, Serial No. 68,594. Divided and this application March 21, 1950, Serial No. 151,009

8 Claims. (Cl. 201—63)

This application is a division of application Serial No. 68,594, filed December 31, 1948 and relates to a novel temperature sensing device for a windshield, and method of making such device.

An object of the invention is to provide a novel temperature sensing element which may be embedded in the windshield of an aircraft.

Another object of the invention is to provide a novel temperature indicating device in the form of a spring of fine wire having a positive temperature coefficient of resistance such as nickel and tungsten and having sufficient elasticity as to permit fabrication of the windshield with the device without breakage of the fine wire spring.

Another object of the invention is to provide a novel method for fabricating a windshield for an aircraft with the novel temperature sensing device.

The above and other objects and features of the invention will appear more fully hereinafter from a consideration of the following description taken in connection with the accompanying drawings wherein two embodiments of the invention are illustrated by way of example.

Temperature sensing element

Figure 1:
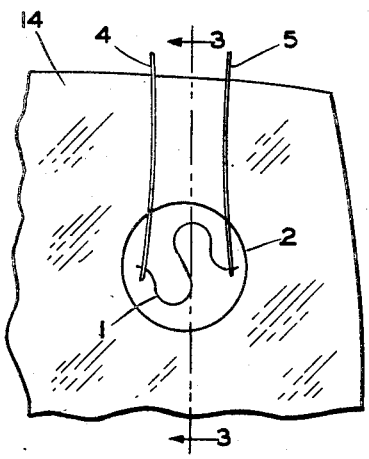
Figure 1 is a fragmentary plan view of a windshield with the thermal indicator embedded therein.

Referring to the drawing, the temperature sensing element indicated in Figure 1 may be formed in a curved loop 1 of a suitable temperature sensitive material having a positive temperature coefficient of resistance such as tungsten or nickel. The loop, as shown in Figure 1, may be molded into a transparent disk 2 of a material such as vinyl resin, and shimstock connecting leads 4 and 5 provided. Alternately, the temperature sensing element may be made, for example, of ten inches of .002 inch diameter nickel wire wound in a flat spiral 6 to an outside diameter of one inch. The flat spiral may in turn be molded into a transparent plastic disk 7 of a material such as vinyl resin and shimstock connecting leads 8 and 9 provided as shown in Figure 2.

Figure 2:
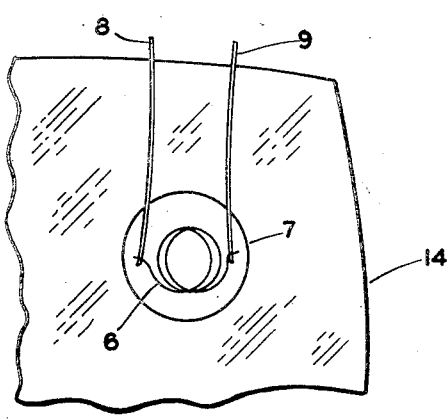
Figure 2 is a plan view of a modified form of thermal indicator.
Figure 4:
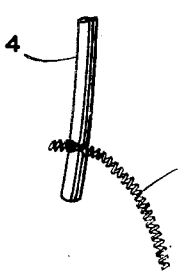
Figure 4 is an enlarged fragmentary view showing the spring construction of the thermal indicator.

The temperature sensing element 1 and 6 of Figures 1 and 2 is wound in the form of a fine wire spring so as to give to the element sufficient elasticity so that the same will not break in the fabrication of the element in the plastic disk. The fine wire spring construction of the temperature sensing element is best shown in the enlarged fragmentary view of Figure 4.

Windshield

Figure 3:
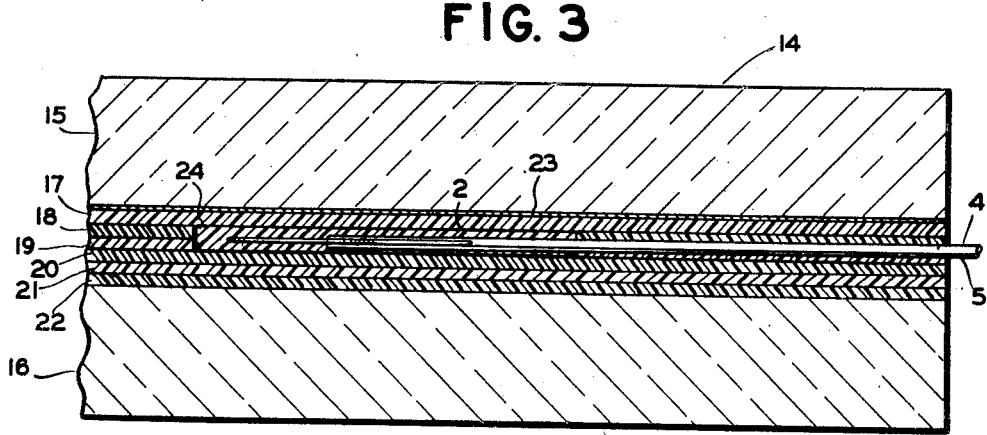
Figure 3 is an enlarged fragmentary end view of the windshield of Figure 1 showing the layer construction of the windshield and with the thermal indicator embedded therein.

The windshield 14 is formed with clear plastic or glass outer layers 15 and 16, as shown in Figure 3, and clear plastic inner layers 17, 18, 19, 20, 21 and 22 formed of vinyl resin or other suitable plastic material well known in the art. Between the glass outer layer 15 and the inner layer 17, there is provided a transparent electrical conductive coating 23 of a material well known in the art.

An opening 24 is provided in the layers 18 and 19 of a size equal to that of the disk of the temperature sensing element. As shown in Figure 3, the disk 2 is embedded in the opening 24 of the plastic layers 18 and 19 and the layers 18 and 19 positioned in place with relation to the several layers 15, 16, 17, 20, 21 and 22, as shown in Figure 3.

The connecting leads 4 and 5 are brought out between the plastic layers 18 and 19 and sufficient high temperatures are then applied to the entire assembly so that disk 2 blends with the layers of clear plastic material so as to form an integral part of the windshield assembly. The plane of the fine wire loop 1 or spiral 6 is arranged in parallel relation to the plane of the conducting coating 23 on the glass and may be positioned at a distance of, for example, .030 inch away from it, being separated by the layer 17 of the plastic material. The plastic material for the disks 2 and 7 may be the same as that for the layers 18 and 19 of the windshield, so that in the completed panel only the small loop 1 and leads 4—5 or spiral 6 and leads 8—9 will be visible in the corners of the windshield 14.

As explained in the parent application Serial No. 68,594, filed December 31, 1948, the transparent electrical conductive coating or resistor 23 may serve as a heating element for the windshield 14 to effect the removal and prevention of the accumulation of ice thereon. The leads 4 and 5 from the temperature sensing element 1 of Figure 1 and the leads 8 and 9 of the temperature sensing element 6 of Figure 2 are adapted to be connected to a suitable mechanism, described and claimed in the aforenoted application so as to control the electrical energization of the transparent electrical conductive coating 23. Thus, the temperature sensing element 1 of Figure 1 and the temperature sensing element 6 of Figure 2 may serve to effectively control the energization of the heating means 23 and thereby the temperature of the windshield 14.

Although only two embodiments of the invention have been illustrated and described, various changes in the form and relative arrangements of the parts may be made to suit requirements.

What is claimed is:

1. A windshield comprising layers of transparent material, a conductor formed of a material having an electrical resistance which varies with changes in temperature, a transparent member formed of a clear material in which said conductor is embedded, and said member being embedded between said layers of transparent material.

2. The combination defined by claim 1 in which said conductor consists of a fine wire spring.

3. The combination defined by claim 1 in which said conductor consists of a flat spiral fine wire spring.

4. A transparent member comprising layers of transparent material, an electrical heating means for said transparent member, a temperature sensitive element embedded in the layers of the transparent material, and electrical conductors leading from said temperature sensitive element to control said heating means.

5. A transparent member comprising a plurality of layers of transparent material including outer layers of glass and an inner layer of resin, a temperature sensitive element embedded in said inner layer of resin, and electrical conductors leading to said temperature sensitive element through said inner layer.

6. In a transparent member comprising a plurality of layers of transparent material including outer layers of glass and an inner layer of resin between said outer layers of glass, and an electrical heating means adjacent to a surface of at least one of said outer layers of glass; the improvement comprising a temperature sensitive element embedded in said inner layer of resin, and electrical conductors extending from said temperature sensitive element through said inner layer of resin to the exterior to effectively control said heating means.

7. In a transparent member comprising a plurality of layers of transparent material including at least one layer of glass, a layer of transparent resin, and transparent electrical conductive heating means between said layers of glass and resin; the improvement comprising a temperature sensitive element embedded in said layer of resin to sense the temperature of the layer of glass, and electrical conductors extending from said temperature sensitive element for controlling the heating means.

8. The combination comprising a transparent member, electrical heating means for said member, a temperature sensitive element embedded in said member, and electrical conductors leading from said element to the exterior of said member and adapted to be connected to a controller for said heating means.

JOEL D. PETERSON.

References Cited in the file of this patent

UNITED STATES PATENTS

| Number | Name | Date |
|---|---|---|
| 2,222,742 | Ducret | Nov. 26, 1940 |
| 2,318,102 | Ruge | May 4, 1943 |
| 2,375,369 | Knight | May 8, 1945 |
| 2,429,420 | McMasters | Oct. 21, 1947 |
| 2,470,509 | Marini | May 17, 1949 |
| 2,470,633 | Mershon | May 17, 1949 |
| 2,488,422 | Mershon | Nov. 15, 1949 |